United States Patent [19]
Buckmaster et al.

[11] Patent Number: 5,957,025
[45] Date of Patent: *Sep. 28, 1999

[54] LARGE FORAGE BALE SLICER

[75] Inventors: Dennis R. Buckmaster, Spring Mills; Kevin M. Smith, Meyerstown, both of Pa.

[73] Assignee: The Penn State Research Foundation, University Park, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/741,841

[22] Filed: Oct. 31, 1996

[51] Int. Cl.⁶ .................................................. B27B 11/00
[52] U.S. Cl. ............................... 83/776; 83/578; 83/717; 83/780
[58] Field of Search ............................. 83/776, 779, 780, 83/795, 928, 268, 578, 713, 717

[56] References Cited

U.S. PATENT DOCUMENTS

| | | | |
|---|---|---|---|
| 3,913,439 | 10/1975 | Large | 83/713 |
| 3,926,086 | 12/1975 | Crane | 83/795 |
| 4,163,524 | 8/1979 | Lundahl et al. | 83/928 |
| 4,187,990 | 2/1980 | Lundahl et al. | 83/490 |
| 4,250,783 | 2/1981 | Ogle | 83/928 |
| 4,771,670 | 9/1988 | Woerman | 83/795 |
| 4,789,289 | 12/1988 | Wilson | 83/909 |
| 5,161,448 | 11/1992 | Wangsness | 83/795 |
| 5,242,121 | 9/1993 | Neier | 83/795 |
| 5,367,932 | 11/1994 | Bergman | 83/425.2 |
| 5,461,957 | 10/1995 | Koch et al. | 83/713 |
| 5,544,822 | 8/1996 | Neier | 83/928 |

OTHER PUBLICATIONS

ASAE, Moisture Measurement—Forages, ASAE Standards 1995, pp. 465, American Society of Agricultural Engineers, St. Joseph, MI.

Anderson, P.M., Preserving and Feeding Round Bale Silage, Paper 84–1533, 1984, American Society of Agricultural Engineers, St. Joseph, MI.

Belyea, R.L., Effect of Particle Size of Alfalfa Hay on Intake, Digestibility, Milk Yield and Ruminal Cell Wall of Dairy Cattle, J. Dairy Sci., 1989, vol. 72, No. 4, pp. 958–963.

Buckmaster, D.R., How Do We Characterize an Adequate TMR Mix, Paper 92–1542, 1992, American Society of Agricultural Engineers, St. Joseph, MI.

Jaster, E.H., Effects of Varying Particle Size of Forage on Digestion and Chewing Behavior of Dairy Heifers, J. Dairy Sci., 1983, vol. 66, p. 802.

Kjelgaard, W.L., Round Bale Silage, Paper 81–1520, 1981, American Society of Agricultural Engineers, St. Joseph, MI.

Martz, F.A., Forage Utilization by the Lactating Cow, J.Dairy Sci., 1986, vol. 69, p. 1996.

McCullough, M. E., Feeding Strategies for the Dairy Herd Require Careful Selection, Feedstuffs Nov. 18, 1991, pp. 14–19.

(List continued on next page.)

*Primary Examiner*—M. Rachuba
*Assistant Examiner*—Sean A. Pryor
*Attorney, Agent, or Firm*—Thomas J. Monahan

[57] ABSTRACT

The present invention provides a bale slicer that processes large forage bales into a form useable by TMR mixing systems. The bale slicer is simple to operate, reduces the power required to process a bale as compared to other bale processors and processes forage bales into a size suitable for use as feed. The bale slicer includes a main frame, bale chamber, platforms, a cutting mechanism, and power mechanism. The bale slicer utilizes a slicing motion by the cutting mechanism to process the large forage bales. The forage bale to be processed remains stationary and is held in its compressed form by the bale chamber during slicing. The cutting mechanism passes by the bale chamber in order to slice the bale. At the end of each slice made by the cutting mechanism, the forage falls to the floor and the bale drops down in the bale chamber in preparation for the return pass by the cutting mechanism. The fallen forage is then ready to be transported to a TMR mixer.

20 Claims, 15 Drawing Sheets

OTHER PUBLICATIONS

Misener, G. C., A Stationary Large Round Bale Shredder, Canadian Agricultural Engineering, 1990, pp. 127–129.

Persson, S., Mechanics of Cutting Plant Material, ASAE Monograph No. 7, 1987, American Society of Agricultural Engineers, St. Joseph, MI.

Rider, A. R., Tub Grinder Evaluation, Paper 78–1044, 1978, American Society of Agricultural Engineers, St. Joseph, MI.

Sniffen, C. J., Effective Fiber in Silage, Silage Production from Seed to Animal, NRAES vol. 67, pp. 176–185.

Whitney, W. K., Midwestern Dairy Expanding, Adopting New Feed Programs, Feedstuffs, Dec. 30, 1991, pp. 17, 22.

Woodford, J. A., Impact of Dietary Fiber and Physical Form on Performance of Lactating Dairy Cows, J. Dairy Sci., 1986, vol. 69, No. 4, pp. 1035–1047.

Woodford, S. T., Effect of Forage Physical Form on Chewing Activity, Dry Matter Intake, and Rumen Function of Dairy Cows in Early Lactation, J. Dairy Sci., 1988, vol. 71, p. 674.

Zhang, M., Efficient Forage Bale Slicing, M. S. Thesis in Agricultural and Biological Engineering, Pennsylvania State University, 1995.

VIEW A-A

LARGE FORAGE BALE SLICER

GOVERNMENT SPONSORSHIP

This invention was made with Government support under the U.S. Department of Agriculture Hatch Act, Project No. 3422. The Government has certain rights in the invention.

BACKGROUND

Large forage bales of hay or silage have gained tremendous popularity in agriculture during the past decade. This is due to the storage requirements for the bales as well as the lower power requirements found in baling the forage as compared to chopping it. At moisture levels of 61%, round baling of forage requires 2.3 kW per hour/metric ton (h/t) of Dry Matter (DM) and chopping the forage requires 7.22 kW h/t DM. At moisture levels of 15%, the energy needed for baling is only 1.1 kW h/t DM. Therefore, large hay or silage bales are an attractive alternative for farmers due to the lower energy requirement to harvest the forage.

One of the preferred manners of feeding cows is to give them a Total Mixed Ration (TMR) of feed prepared with a mixer. A TMR of feed is defined as being everything a cow eats in one single mixture. It has been reported that over half of the cows in the United States are fed using the TMR feed. This is largely due to the TMR feed providing uniform nutritional value in every mouthful. Consequently, the TMR feed allows for better monitoring of feed intake and provides a feed with improved digestibility. The problem presented by the large forage bales is that they are not readily usable in TMR mixing systems. In order to introduce the baled forage into a TMR mixer, some processing must be done to the bale. This processing includes the reduction of the bale and reduction of the forage particles contained in the bale.

Currently, there are bale reduction machines available to process the large bales in a form useable by TMR mixers, however, most of them require a great deal of power in the range of 45 and 60 kW. These power requirements generally necessitate the use of a large power unit such as a tractor. Current bale reduction machines also excessively reduce the particle size of the forage. Ideally a large forage bale processor should reduce particle size of the forage just enough to facilitate mixing and delivery in the TMR mixer and no more. Studies have indicated that when particle size is decreased excessively, milk fat percentage and digestion efficiency can decrease. Finely chopped feed may also cause improper rumen function and a decrease in rumen pH. It has been suggested that 19 mm is the critical length of forage particles and that particle sizes lower than this fail to stimulate rumination. So, it appears that while particle reduction is necessary for handling purposes, any additional particle size reduction is not beneficial for animal nutrition.

There are several tub grinders available that process large hay bales into a form useable by most TMR mixers. Most of these grinders use a grinding or shredding motion to process the hay. These grinders require large amounts of power which are on the order of 26 kW h/t DM. Another design uses a slicing motion, but this has not been adapted to process large round bales. In addition, bale grinders also create substantial losses of forage during the processing. The grinding losses have been measured to be between two and nine percent, with the potential for much higher loss in extreme windy conditions when the grinder is used outside. Most of these losses are from the leaves, which are the most fragile and nutritious parts of the forage. Also available is a large bale shredder which requires less power than the previously mentioned tub grinders. The shredder utilizes three rotating cylinders with knives attached to the perimeter. The cylinders rotated at about 210 rpm and the processing (feed) rate was approximately 0.75 kg/s which is, or about one-seventh the rate of tub grinders. The average length of cut was about 50 mm and it required 4.05 kW h/t DM to process the bales. Although the design reduced the power requirements, it still produced an excessive amount of dust, making it unacceptable for use in closed buildings.

It is the objective of this invention to provide a large forage bale processor which slices large forage bales into material suitable for use in most TMR mixers, reduces the energy consumed during processing and controls the particle size reduction of the baled forage.

SUMMARY OF THE INVENTION

The present invention is a bale slicer for reducing bale size of large forage bales produced by farmers so that the forage may be mixed into TMR mixing systems with other forms of feed. The bale slicer has a main frame to support the operating parts of the slicer. A bale chamber having end walls and side walls supported by the main frame holds the bale stationary during slicing. A double sided blade mounted to a knife bar moves across the bale as one side of the blade slices the bale. During movement of the knife bar, a pair of platforms for securing the bale in the bale chamber move with the knife bar. The platforms are positioned so that one of the platforms is in a leading position ahead and below the slicing action of the knife bar while supporting the bale. Meanwhile the other platform is in a trailing position behind and above the knife bar while supporting the remaining portion of the bale from the double sided blade. The knife bar and the platforms are interconnected for movement across the bale and the platforms are interconnected for trading positions. The knife bar oscillates during slicing of the bale which is accomplished by using a hydraulically powered double rod cylinder. The bale slicer is constructed to allow the platforms to trade the leading and trailing positions so that the knife bar can make a return pass across the bale using the other side of the blade.

BRIEF DESCRIPTION OF THE DRAWINGS

FIG. 17 is a perspective top view of the bale chamber of the bale slicer shown in FIG. 1;

FIG. 18 is a perspective view of the bale chamber of the bale slicer shown in FIG. 1;

FIG. 19 is a perspective view of the leg and wheel of the main frame of the bale slicer shown in FIG. 1;

FIG. 20 is a perspective end view of the platform supports and platforms of the bale slicer shown in FIG. 1;

FIG. 21 is a perspective end view of the platform supports and platforms of the bale slicer shown in FIG. 1;

FIG. 22 is a perspective view of the knife bar support and knife bar rail of the bale slicer shown in FIG. 1;

FIG. 23 is an end view of the platform supports of the bale slicer shown in FIG. 1;

FIG. 24 is a schematic side view of the rails and openings of the platform supports of the bale slicer shown in FIG. 1;

FIG. 25 is a side view of the mounting bracket of the bale slicer shown in FIG. 1;

FIG. 26 is a perspective view of the mounting bracket of the bale slicer shown in FIG. 1;

FIG. 27 is a perspective view of the micro-switch for the double rod cylinder of the bale slicer shown in FIG. 1;

FIG. 28 is an end view of the mounting bracket of the bale slicer shown in FIG. 1;

FIG. 29 is a perspective side view of the mounting bracket of the bale slicer shown in FIG. 1;

FIG. 30 is a perspective side view of the mounting bracket wheels of the bale slicer shown in FIG. 1;

FIG. 31 is a perspective end view of the cable cylinder mounted to the main frame of the bale slicer shown in FIG. 1;

FIG. 32 is a schematic diagram of the hydraulic circuit of the double rod cylinder;

FIG. 33 is a logic diagram for the double rod cylinder;

FIG. 34 is a schematic diagram of the hydraulic circuit of the cable cylinder;

FIG. 35 is a logic diagram for the cable cylinder; and

FIG. 36 is a wiring diagram of the electro-hydraulic circuits of the bale slicer shown in FIG. 1;

DETAILED DESCRIPTION

Figure 1:
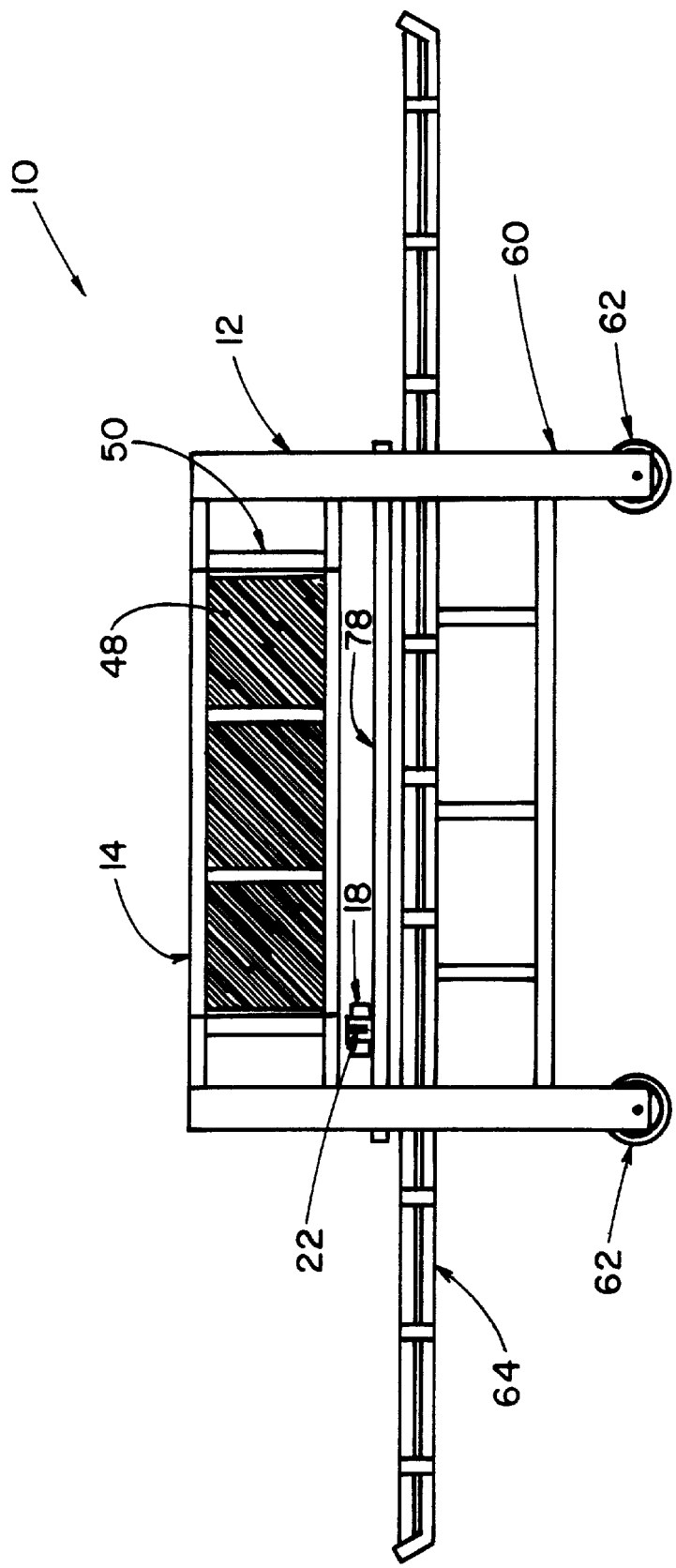
FIG. 1 is a side view of a bale slicer prototype of the present invention.
Figure 2:
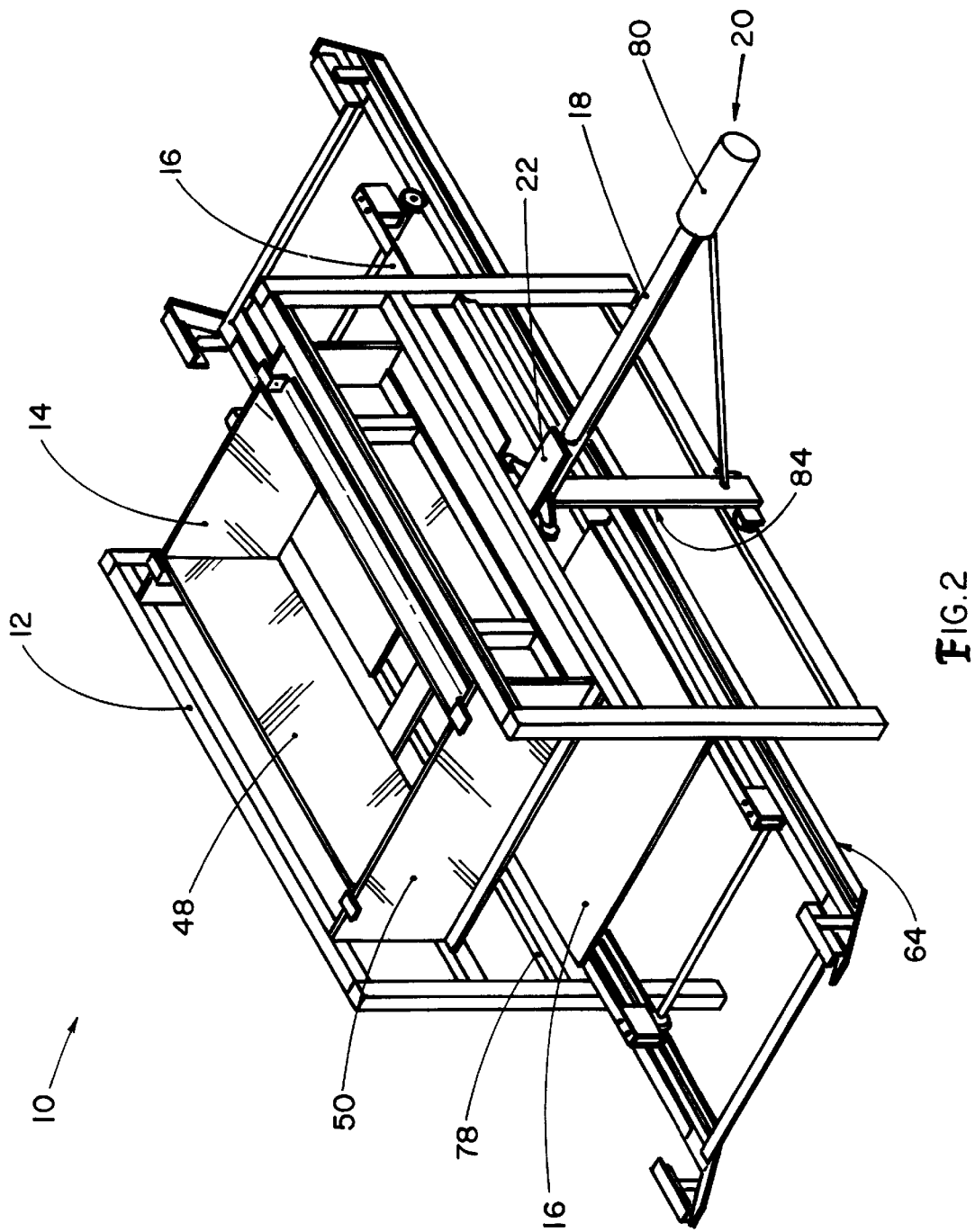
FIG. 2 is a perspective view the bale slicer shown in FIG. 1.
Figure 3:
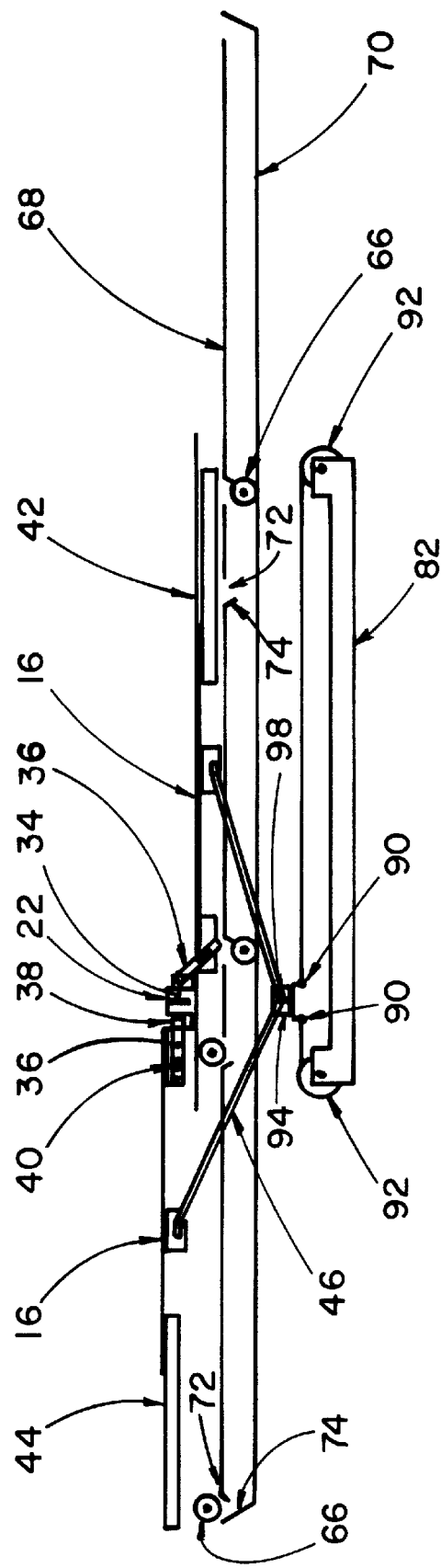
FIG. 3 is a perspective view the bale slicer shown in FIG. 1.

The present invention provides a bale slicer that processes large forage bales into a form useable by TMR mixing systems. As will be explained hereinafter in more detail, the bale slicer is simple to operate, reduces the power required to process a bale as compared to other bale processors and processes forage bales into a size suitable for use as feed. FIGS. 1–3 illustrate a working prototype of the large forage bale slicer 10 which includes a main frame 12, bale chamber 14, platforms 16, a cutting mechanism 18, and power mechanism 20. The main frame 12 is a structure to support the bale chamber 14, platforms 16, cutting mechanism 18, and power mechanism 20. The bale slicer 10 utilizes a slicing motion by the cutting mechanism 18 to process the large forage bales. The forage bale to be processed remains stationary and is held in its compressed form by the bale chamber 14 during slicing. The cutting mechanism 18 passes by the bale chamber 14 in order to slice the bale that is extending downwardly from the bale chamber 14. At the end of each slice made by the cutting mechanism 18, the forage falls to the floor and the bale drops down in the bale chamber 14 in preparation for the return pass by the cutting mechanism 18. The fallen forage is then ready to be transported to a TMR mixer.

Figure 4:
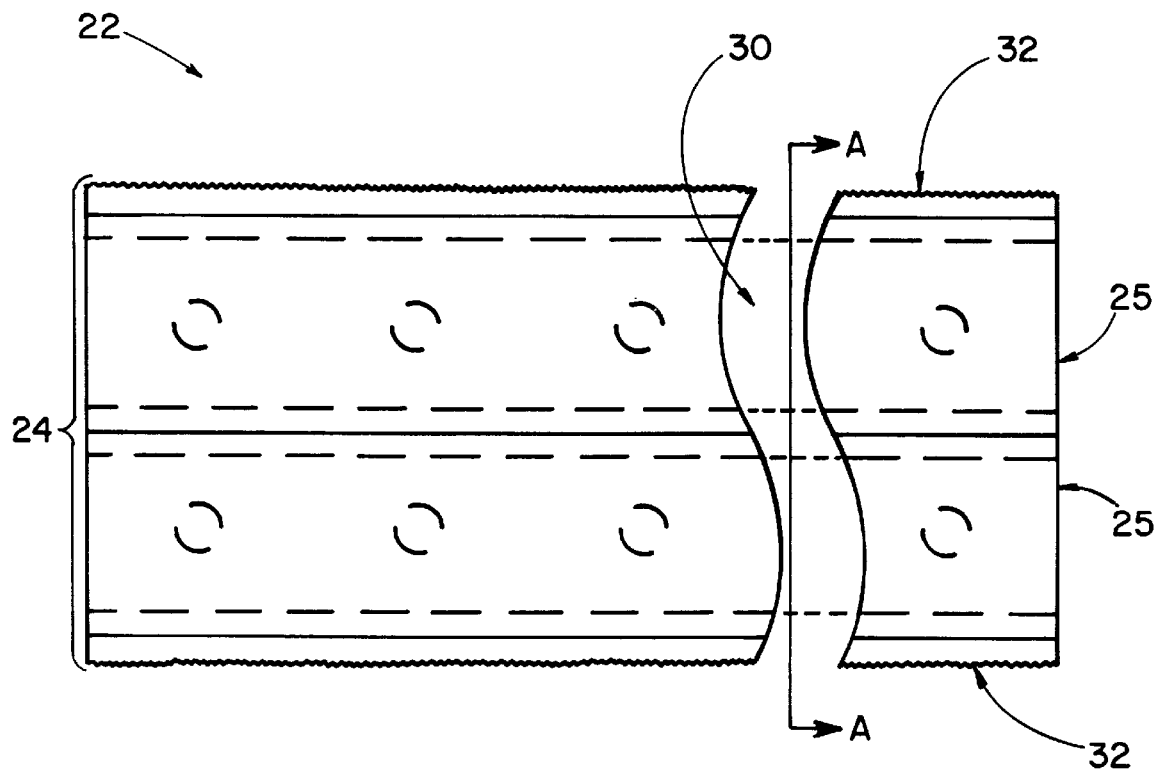
FIG. 4 is schematic side view of the platforms and cutting mechanism of the bale slicer shown in FIG. 1.
Figure 5:
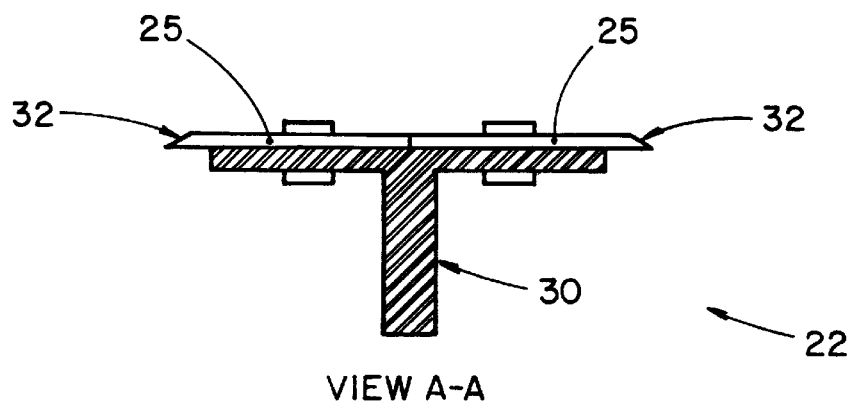
FIG. 5 is a top view of the knife bar of the bale slicer shown in FIG. 1.
Figure 6:
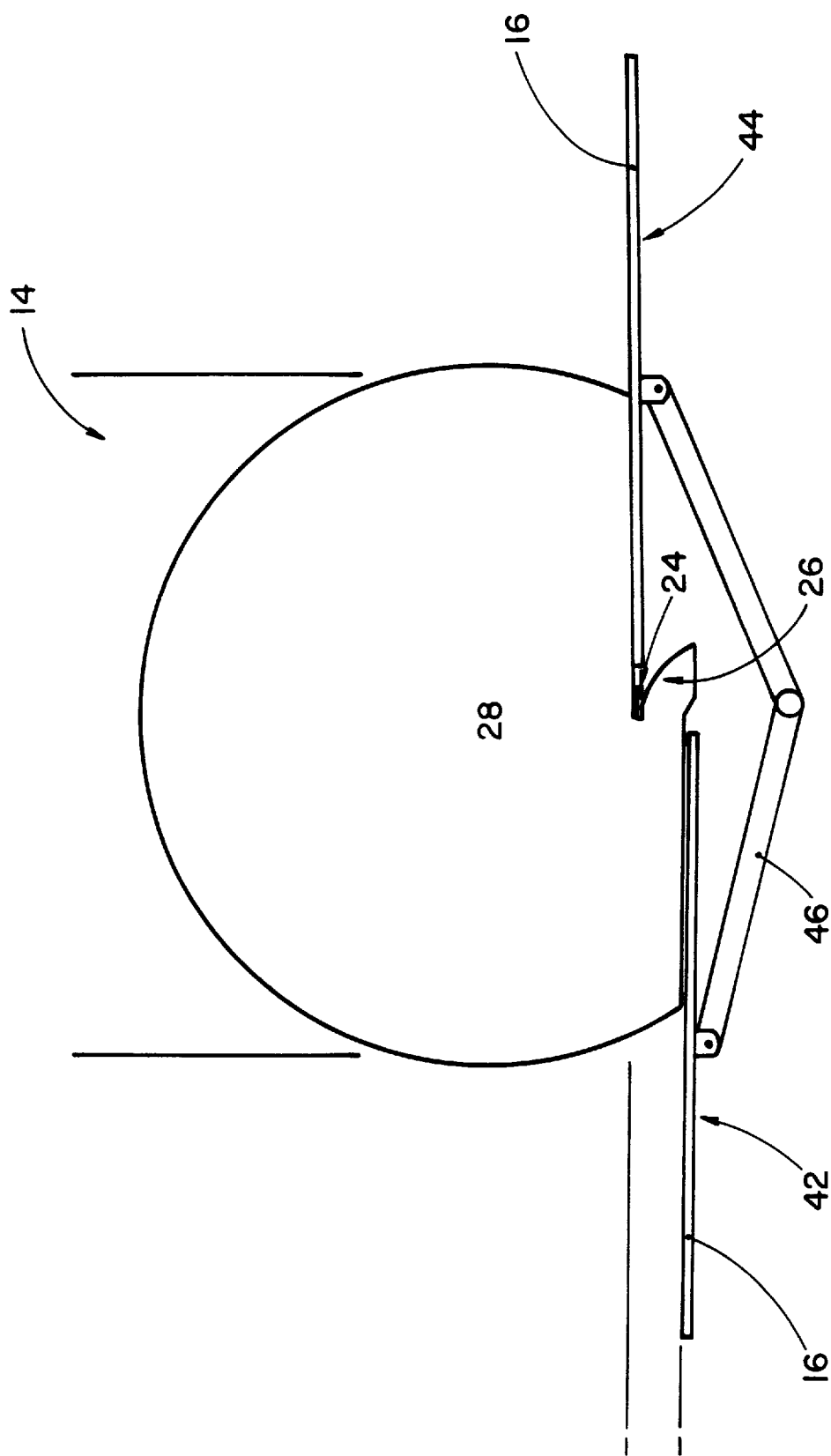
FIG. 6 is a cross-sectional view of the knife bar shown in FIG. 5.
Figure 7:
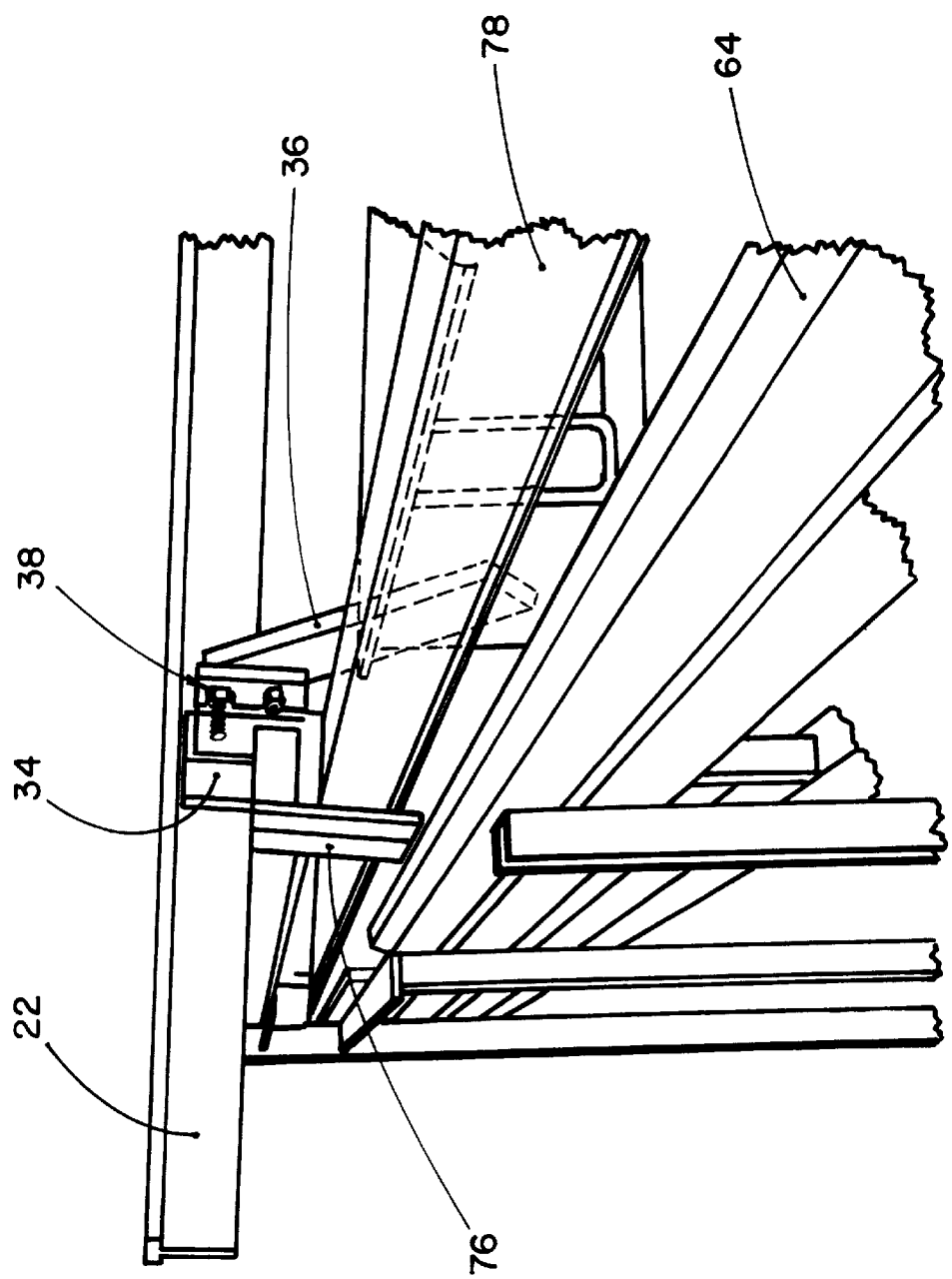
FIG. 7 is a schematic side view of the platforms and blade of the bale slicer shown in FIG. 1 during slicing.

The cutting mechanism 18 can be any variety of blades or knife bars. In the case of the prototype, a knife bar 22 with an oscillating double-sided blade 24 was employed as shown in FIGS. 1 and 3–5. The oscillating knife bar 22 moves along the main frame 12 past the bale chamber 14 as one side of the blade 24 slices a layer 26 from bale 28 positioned in the bale chamber 14 as shown in FIG. 7. On its return pass, the knife bar 22 is able to slice another layer 26 from the bale 28 using the other side of the blade 24. Thus, the double-sided blade 24 allows the cutting of the bale 28 in either direction that the knife bar 22 travels pass the bale chamber 14. As shown in FIGS. 5–6, a Tee cross-section 30 of steel having the blade 24 riveted onto it was chosen for the knife bar 22 to keep the assembly from buckling during operation. In the case of the prototype, two individual blades 25 having a serrated edge 32 were riveted to the Tee cross-section 30 in parallel with the serrated edges 32 of each blade 25 facing in opposite directions to form the double-sided blade 24. The Tee cross-section 30 of the prototype knife bar 22 had a height of 5.4 cm and a width of 12.7 cm. The prototype knife bar 22 and blade 24 were 2.1 m long in order to slice bale diameters of 1.5 m as well as having stroke lengths up to 40 cm for each oscillation. Knife bar bushings 34 at each end of the knife bar 22 provide support while allowing oscillation of the knife bar 22 during slicing as shown in FIGS. 4 and 8–10. The knife bar bushings 34 of the prototype were made of Ultra High Molecular Weight plastic in order to reduce friction as the knife bar 22 oscillates.

Figure 8:
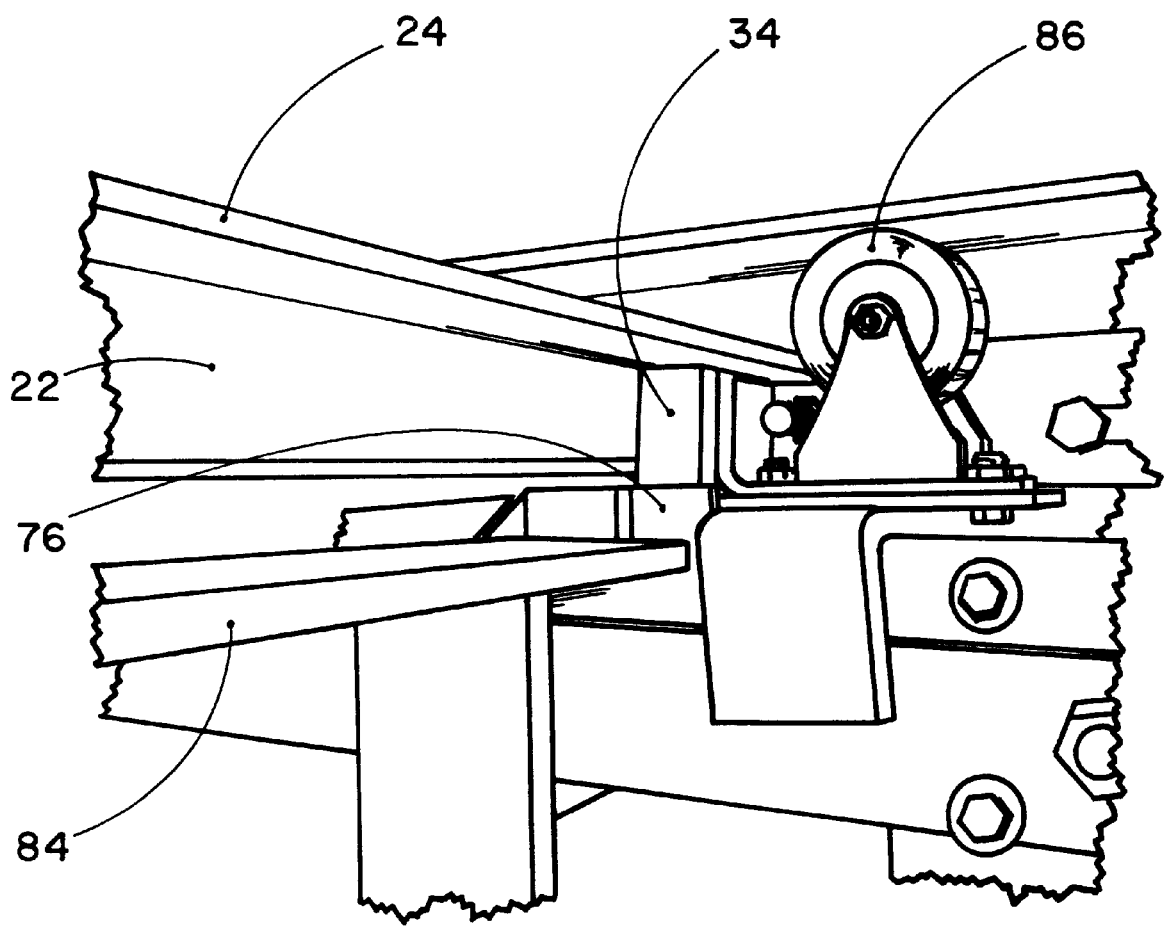
FIG. 8 is a perspective view of the knife bar components of the bale slicer shown in FIG. 1.
Figure 9:
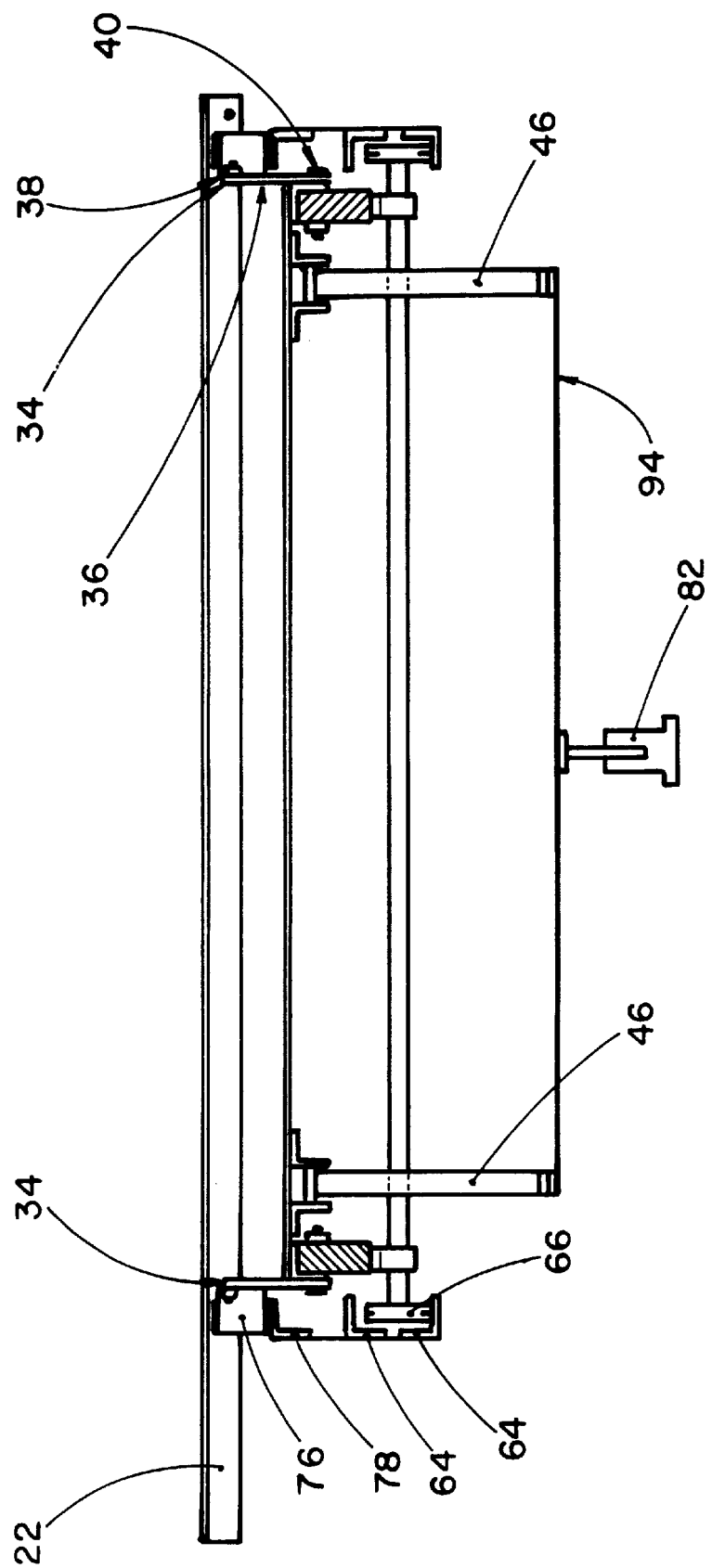
FIG. 9 is a perspective view of the knife bar and mounting bracket of the bale slicer shown in FIG. 1.
Figure 10:
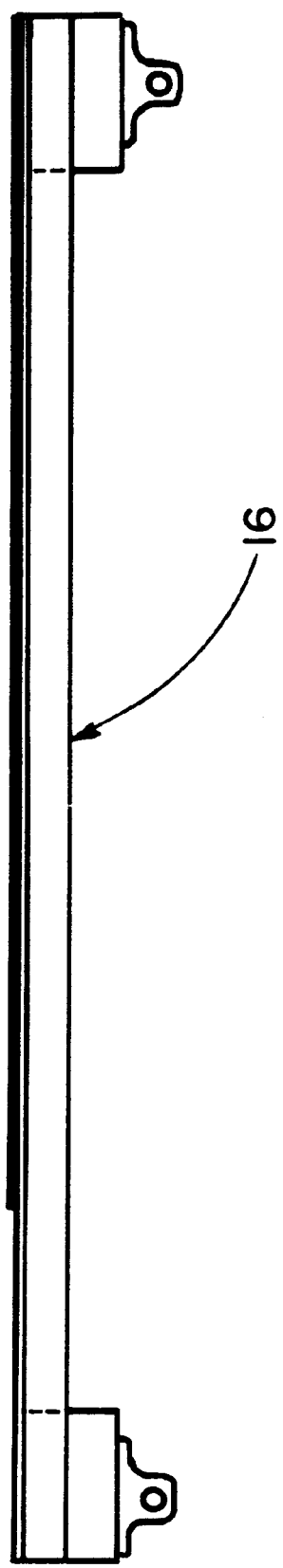
FIG. 10 is an end view of the platforms and knife bar of the bale slicer shown in FIG. 1.
Figure 11:
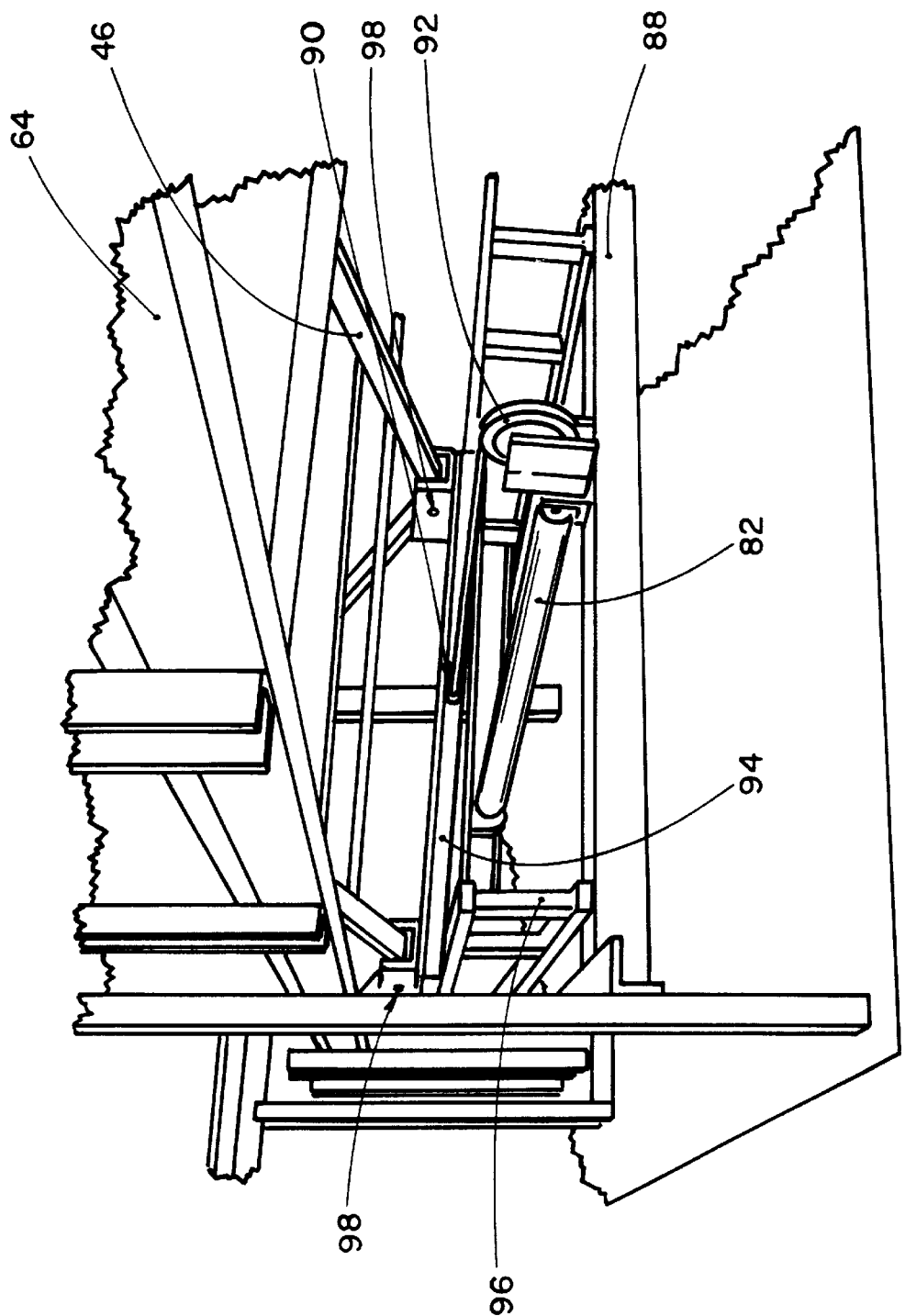
FIG. 11 is a side view of a platform of the bale slicer shown in FIG. 1.

In order to secure the bale from falling out of the bale chamber 14 during slicing, a twin platform system was employed as depicted in FIG. 7. A platform 16, as shown in FIG. 11, is positioned on either side of the knife bar 22 and interconnected with the knife bar 22 for coordinated movement of all three. In the case of the prototype the interconnection with the knife bar 22 was made with flat rectangular steel plates 36 as shown in FIGS. 4, 8 and 10. These steel plates 36 are rotatable at the knife bar connection point 38 and rotatably slideable at the platform connection point 40. During processing, the platforms 16 move along with the knife bar 22 across the bottom of the bale 28 while supporting the bale 28 in the bale chamber 14. During slicing, one platform 16 is designated as a leading platform 42 and the other platform 16 is designated as a trailing platform 44 as shown in FIGS. 4 and 7. The leading platform 42 is always the platform 16 ahead of the side of the blade 24 that is slicing the bale 28 and provides the initial support of the bale 28 at the bale chamber 14. The leading platform 42 position is at a lower plane than the knife bar 22 to initiate the cutting of the bale 28. The trailing platform 44 is always behind the side of the blade 24 that is slicing the bale 28 and is located slightly above the knife bar 22 and against the freshly cut portion of the bale 28. The trailing platform 44 is used to remove the weight of the bale 28 from the blade 24 as well as support the bale 28. The platforms 16 are attached to each other by a pair of rocker arms 46, as shown in FIGS. 4, 7, 10 and 12–14, so that at the end of each slice the leading platform 42 lifts up while the weight of the bale pushes the trailing platform 44 down. This motion by the bale 28 and rocker arms 46 positions each platform 16 so that the trailing platform 44 is now the leading platform 42 and the leading platform 42 is now the trailing platform 44. This trading of positions by the platforms 16 allows the knife bar 22 to slice the bale in the opposite direction on its return pass. The leading platform 42 of the working prototype was setup to be on a plane 11.4 cm lower than the blade 24, thus allowing for a 11.4 cm width of cut of the bale 28. This width of cut was selected to prevent over-processing while still producing particle sizes useable by TMR mixers. The trailing platform 44 was setup to be on a plane less than 1 cm higher than the knife bar 22 so that the weight of the bale did not rest on the knife bar 22.

The bale is held stationary for slicing by side walls 48 and end walls 50 of the bale chamber 14 as shown in FIGS. 1, 3 and 15–18. The end walls 50 of the bale chamber 14 are stationary and mounted to the main frame 12. The side walls 48 of the bale chamber 14 are adjustable for length and width of the bale. These adjustable side walls 48 keep the bale in its compressed state during slicing which allows for a more efficient cut by the blade 24. Adjustments are made by removing pins 52 which are inserted through both side wall brackets 54 and the end walls 50 of the bale chamber 14. The pins 52 are reinserted after moving the side walls 48 into position and aligning side wall holes 56 in the side wall brackets 54 with adjustment holes 58 found in the end walls 50. The prototype walls were all about 60 cm high and 183 cm wide. All of the walls of the bale chamber 14 can be supported by angle iron as shown in the figures.

The main frame 12 is a box frame which houses the bale chamber 14 in its upper portion while the lower portion includes legs 60 which support the whole structure on ground level as shown in FIGS. 1–3, 14 and 18. The main frame 12 of the prototype was constructed from steel. Wheels 62 can be included at the bottom of the legs 60 as shown in FIG. 21 to add mobility to the bale slicer 10. Below the bale chamber 14 and above the ground level is a platform support 64 connected on each side of the main frame 12 as shown in FIGS. 1–3, 8, 10, 13 and 20–23. Each platform support 64 is mounted on the inside of the main frame 12 and extends longitudinally from the main frame 12. The platforms 16 include platform wheels 66 of the pulley variety which travel along upper rails 68 and lower rails 70 that are part of each platform support 64 as shown in FIGS. 4, and 20, 21, 23, 24. The leading platform 42 travels along the lower rails 70 while the trailing platform 44 travels along the upper rails 68. There are openings 72 in the upper rails 68 which include guide stops 74 at the openings 72. At the end of a knife bar 22 pass, the openings 72 allow the leading platform 42 to follow the guide stops 74 and rise onto the upper rails 68 into the trailing platform 44 position. Meanwhile due to the rocker arm motion, the trailing platform 44 follows the guide stops 74 and lowers onto the lower rails 70 into the leading platform 42 position.

The knife bar 22 is supported at each end in the main frame 12 by knife bar supports 76 which hold the knife bar bushings 34 in place as shown in FIGS. 4–5, 9–12, 24 and 28. Mounted inside the main frame 12 between each platform support 64 and the bale chamber 14 are two knife bar rails 78. Each of the knife bar rails 78 is mounted in parallel with the platform supports 64. The knife bar supports 76 are constructed so they are slideable along the knife bar rails 78. The relationship between the knife bar supports 76 and the knife bar rails 78 can be steel on steel or can have some type of bearing between them such as the Ultra High Molecular Weight plastic to reduce friction. In the case of the prototype the Ultra High Molecular Weight plastic was mounted under each knife bar support 76 to interact with the knife bar rail 78. The knife bar supports 76 are also the knife bar connection point 38 for the steel plates 36 connecting the platforms 16 to the knife bar 22.

The bale slicer 10 can be equipped to oscillate the knife bar 22 and move the knife bar-platform combination using various power devices such as electric motors, engines and hydraulics. For the prototype, the knife bar 22 was oscillated by a hydraulic double rod cylinder and the knife bar-platform combination was moved by a hydraulic rodless cable cylinder. Both hydraulic cylinders were energized by a standard power unit. As illustrated in FIGS. 25–27, the double rod cylinder 80 was chosen because it provides an equal speed oscillation during extension and retraction of the knife bar 22. The double rod cylinder 80 of the prototype had a 45.7 cm stroke with a 2.86 cm rod and 3.8 cm bore. The system pressure for double rod hydraulic circuit was 10.3 Mpa giving a maximum force capability of 5.1 kN. The double rod hydraulic circuit is shown in FIGS. 32–33 In order to support the double rod cylinder 80 a mounting bracket 84 attached to one of the knife bar supports 76 was employed that would move with knife bar 22 during slicing as shown in FIGS. 9 and 25–30. For smooth movement of the mounting bracket 84 with the knife bar 22, wheels 86 are attached to the mounting bracket 84 to interact with the structure of the main frame 12.

Figure 12:
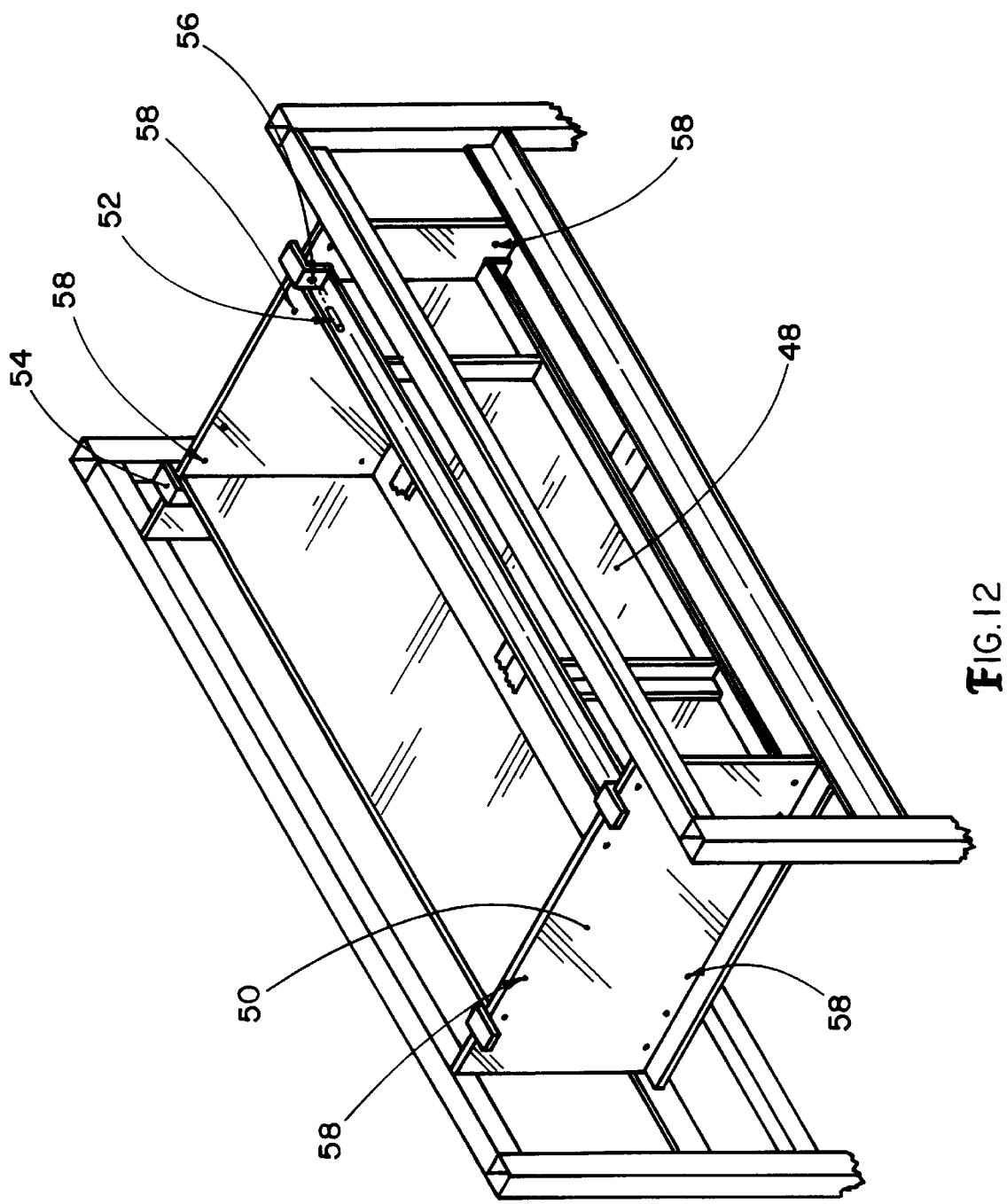
FIG. 12 is a perspective view of the rocker arm assembly of the bale slicer shown in FIG. 1.
Figure 13:
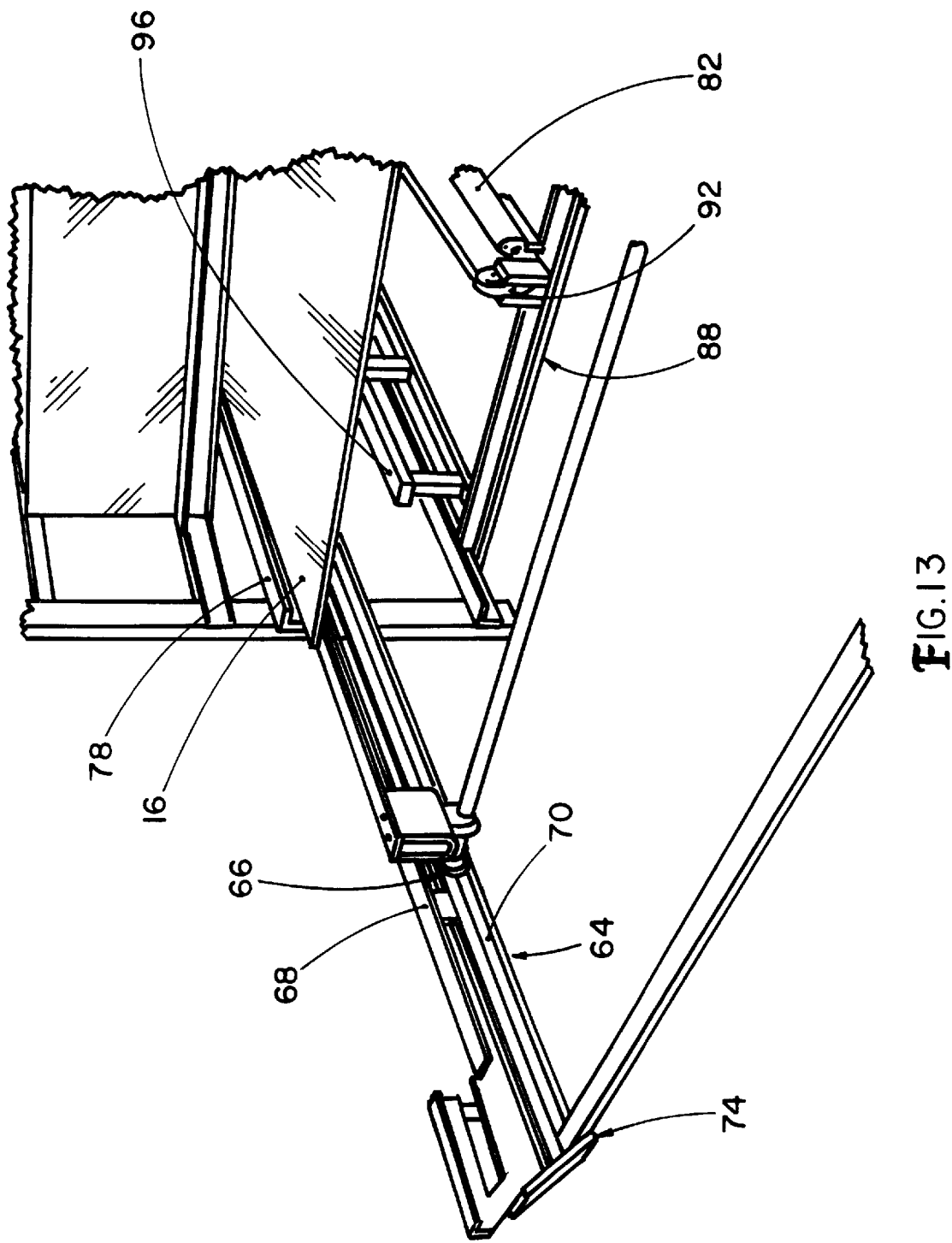
FIG. 13 is a perspective view of the rocker arm assembly of the bale slicer shown in FIG. 1.
Figure 14:
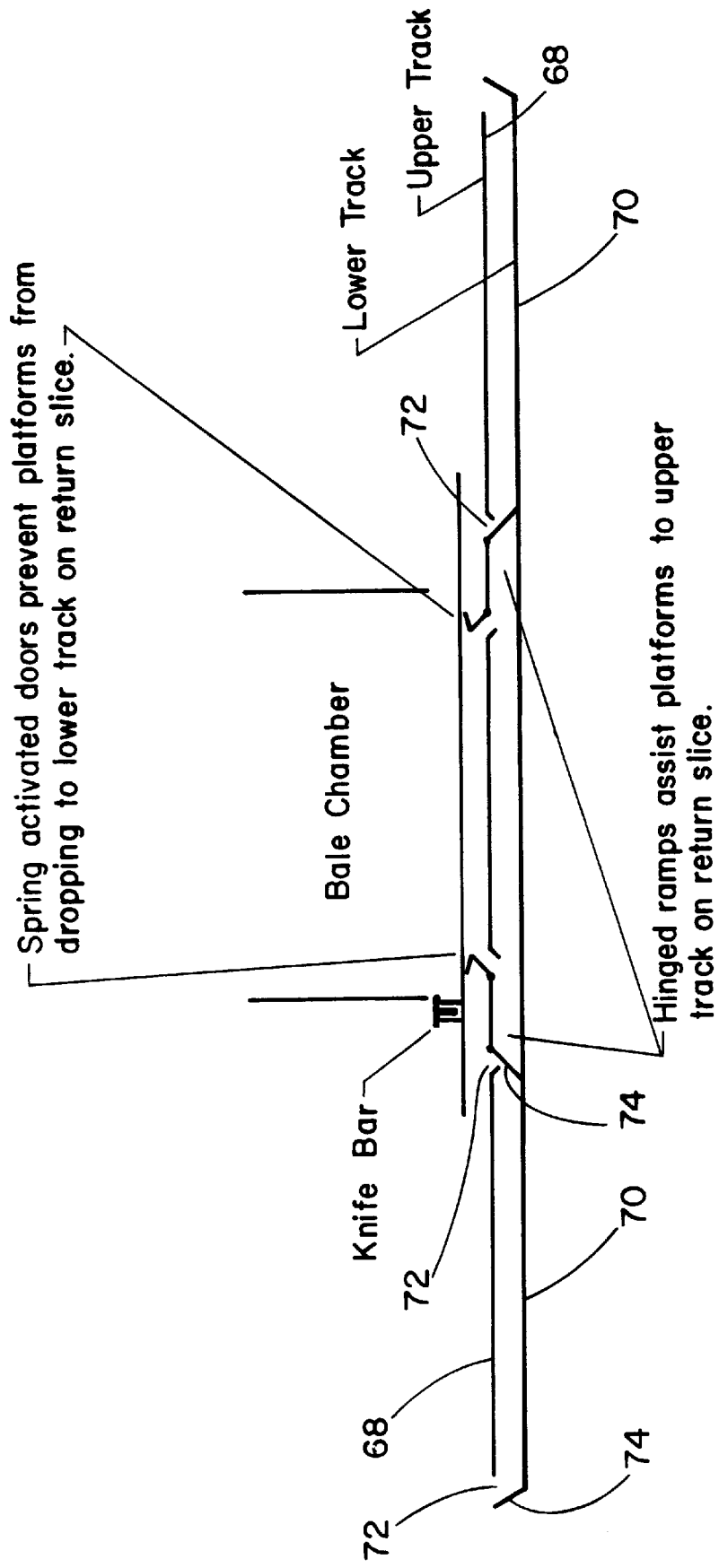
FIG. 14 is a perspective view of the cable cylinder and rocker arm assembly of the bale slicer shown in FIG. 1.
Figure 15:
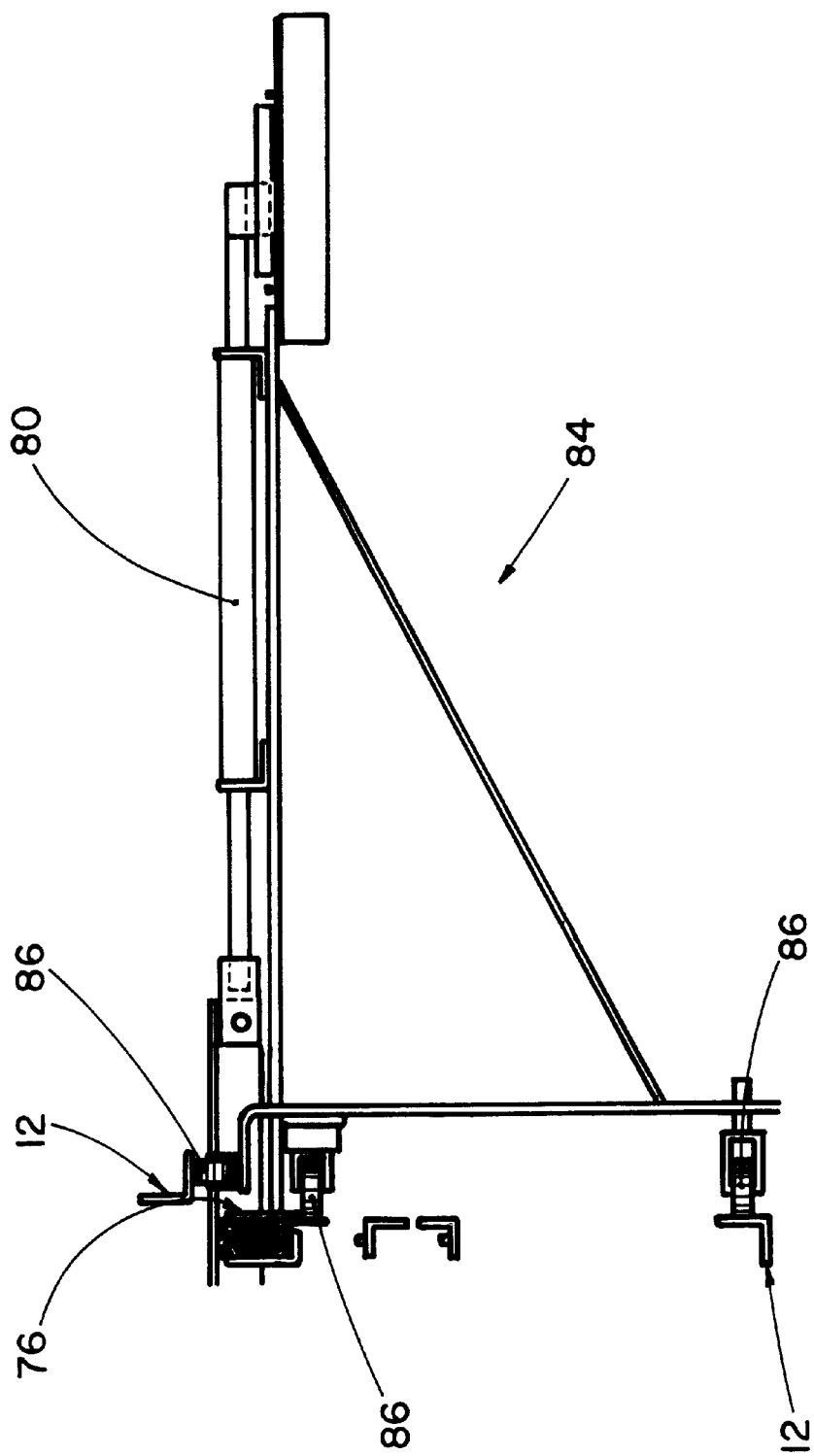
FIG. 15 is a perspective side view of the bale chamber of the bale slicer shown in FIG. 1.
Figure 16:
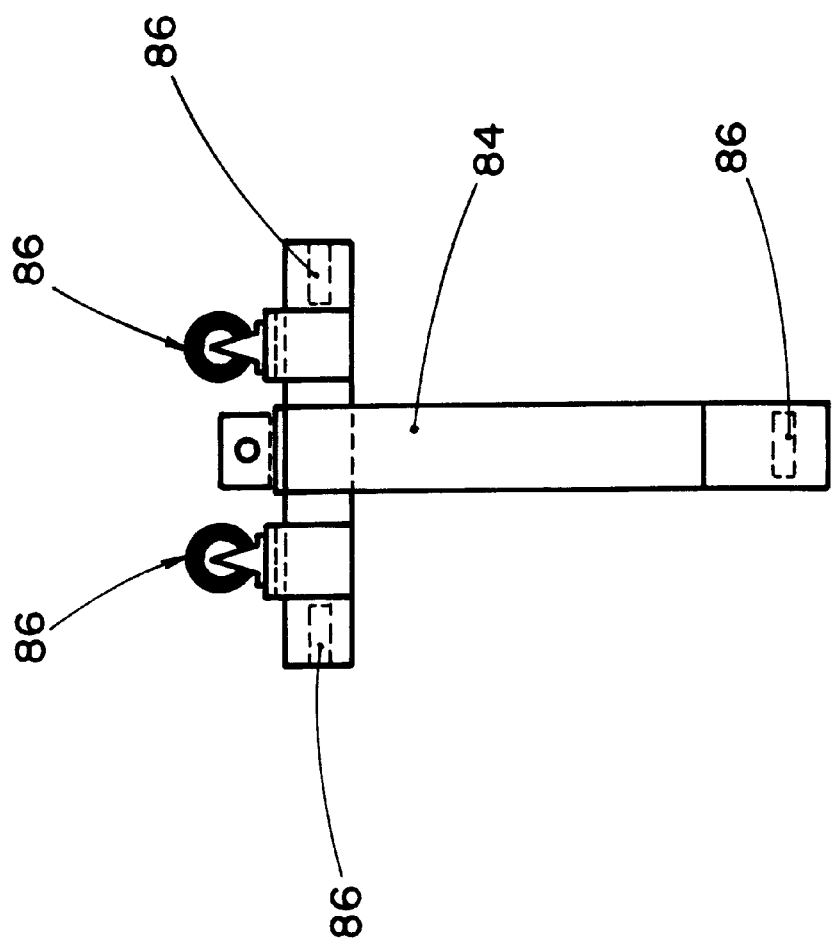
FIG. 16 is a perspective top view of the bale chamber of the bale slicer shown in FIG. 1.

The rodless cable cylinder 82, as shown in FIGS. 4, 10, 14, 22 and 31, is mounted to cross-members 88 of the main frame 12. Cable ends 90 from the cable cylinder 82 were looped around cable pulleys 92 mounted at each end of the cable cylinder 82 and attached to a rocker arm bracket 94 as shown in FIGS. 4, 12–14 and 31. The rocker arm bracket 94 interconnects the rocker arms 46 and is supported by rocker arm rails 96 shown in FIGS. 12–13. The rocker arm rails 96 are positioned so that they do not interfere with the forage falling from the bale chamber 14 after its been sliced. Shown in FIGS. 12–13 are connection points 98 between the rocker arms 46 and the rocker arm bracket 94 that also act as the pivot points for the rocker arms 46 when the platforms 16 change position relative to the upper and lower rails 68, 70. The platform 16 and the knife bar 22 due to their interconnection by the steel plates 36 will move across the bottom of the bale when the cable cylinder 82 is actuated and moves the rocker arm bracket 94. The rocker arm bracket 94 movement will be in the same direction as the cable end 90 that is moving toward its respective cable pulley 92. The cable cylinder 82 used in the prototype was rated for 3.45 MPa with a bore diameter of 6.35 cm and a stroke of 183 cm having the hydraulic circuit shown in FIGS. 34–35.

In order to achieve full automation of the bale slicer 10, electro-hydraulics were incorporated as shown in the schematics of FIGS. 32–36. Automatic oscillation of the knife bar 22 was achieved with the use of an optical sensor (not shown) at each end of the knife bar 22. As shown in FIGS. 27 and 30, the optical sensors each activate their respective switch solenoids 101 connected to a three-position, open-centered directional control valve 102 which triggers the back and forth motion of the double-rod cylinder. It was also desired to automate platform 16 and knife bar 22 movement so that they continuously pass back and forth under the bale chamber 14. This was accomplished by placing a micro-switch 103 (FIG. 21) at both ends of the stroke of the cable cylinder 82. Similar to the operation of the double rod cylinder hydraulic circuit, these micro-switches 103 activate their respective solenoid connected to a three position open-centered directional control valve 104 (FIG. 19) operating the cable cylinder 82. This combination of electronics allows the user to flip an on-off switch for each solenoid valve and start the power unit. The bale slicer 10 then operates continuously until one of the switches is disengaged.

The specific power of the bale slicer 10 for slicing dry bales of hay was determined to be 0.73 kWh/t DM at a knife bar stroke length of 22.9 cm and a knife bar oscillation frequency of 1.3 Hz. This was found to be the most efficient setting for the prototype. When the oscillation frequency was increased to 2 Hz for the 22.9 cm stroke length, the specific power was found to increased to 1.49 kWh/t DM. Throughout testing, the effect of blade frequency was consistent, where a lower blade frequency led to a lower specific power. For bales of hay having a higher moisture content, the 22.9 cm stroke was used with an oscillation frequency of 1.87 Hz. The resultant average specific power was 2.9 kW h/t DM. Therefore, the specific power required to operate the prototype with a 22.9 cm stroke was consistently less than the bale processors mentioned in the background. For the most efficient settings, the specific power of the prototype was 95% less than that of a tub grinder and 80% less than that of a bale shredder. From the tests of the prototype, it is evident that forage can be processed more efficiently by slicing then by grinding. Much of this power reduction can be attributed to the fact that the bale slicer 10 does not over process the forage. The resultant forage processed by the prototype ranged in size from about 10 cm to over 30 cm which was suitable for blending in most TMR mixers.

Thus the present invention provides an alternative for reducing the size of large forage bales that reduces the power required, provides a processor which does not over process the forage and is simple enough to operate that its functions can be automated.

While an embodiment of the invention has been described in detail herein, it will be appreciated by those skilled in the art that various modifications and alternatives to the embodiment could be developed in light of the overall teachings of the disclosure. Accordingly, the particular arrangements are illustrative only and are not limiting as to the scope of the invention which is to be given the full breadth of the appended claims and any and all equivalents thereof.

We claim:

1. A bale processor for reducing bale size of a stationary forage bale into a useable form for feed mixing comprising:
   a main frame;
   a bale chamber having a length and width and supported by said main frame;
   a support for securing the bale in said bale chamber during processing of the stationary bale;
   a cutting mechanism for reducing the size of the stationary bale, wherein said cutting mechanism moves across said bale during cutting;
   a cutting blade having a length at least said width of the bale chamber mounted to said cutting mechanism;
   at least one cutting edge running said length of said cutting blade; and
   a power mechanism to drive said cutting mechanism.

2. The bale processor of claim 1, wherein said cutting mechanism includes a knife bar to which said cutting blade is mounted.

3. The bale processor of claim 1, wherein said cutting blade includes two cutting edges running said length of said cutting blade and wherein said two cutting edges face in opposite directions.

4. The bale processor of claim 1, wherein said cutting blade oscillates during cutting of the bale.

5. The bale processor of claim 4, wherein oscillation of said knife bar is hydraulically powered by a double rod cylinder.

6. The bale processor of claim 1, wherein said support for securing the bale includes two platforms.

7. The bale processor of claim 6, wherein said cutting mechanism is positioned between said platforms.

8. The bale processor of claim 7, wherein said platforms move across the bale during cutting of the bale.

9. The bale processor of claim 8, wherein one of said platforms is in a leading position ahead, below and moving with the slicing action of said knife bar while supporting the bale and wherein the other of said platforms is in a trailing position behind, above and moving with said knife bar while supporting a remaining portion of the bale from said cutting blade.

10. The bale processor of claim 9, wherein said main frame further includes platform supports to support said platforms during movement of said platforms with said knife bar.

11. The bale processor of claim 10, wherein said platforms trade the positions of said leading and trailing positions so that said knife bar can make a return pass across the bale.

12. The bale processor of claim 11, wherein said platforms further include wheels and said platform supports further include rails to guide said wheels during movement of said platforms with said knife bar.

13. A bale processor for reducing bale size of a forage bale into a useable form for feed mixing comprising:
   a main frame:
   a bale chamber supported by said main frame;
   a support for securing the bale in said bale chamber during processing of the bale;
   said support including two platforms that move across the bale during cutting of the bale;
   a cutting mechanism for reducing the size of the bale;
   said cutting mechanism positioned between said platforms and movable across the bale during cutting of the bale;
   said cutting mechanism including a knife bar and a double sided blade mounted to said knife bar for slicing the bale;
   one of said platforms in a leading position ahead, below and moving with a slicing action of said knife bar while supporting the bale and wherein the other of said platforms is in a trailing position behind, above and moving with said knife bar while supporting a remaining portion of the bale from said double sided blade; and
   a power mechanism to drive said cutting mechanism.

14. The bale processor of claim 13, wherein said main frame further includes platform supports to support said platforms during movement of said platforms with said knife bar.

15. The bale processor of claim 14, wherein said platforms trade the positions of said leading and trailing positions so that said knife bar can make a return pass across the bale.

16. The bale processor of claim 15, wherein said platforms further include wheels and said platform supports further include rails to guide said wheels during movement of said platforms with said knife bar.

17. The bale processor of claim 16, wherein said knife bar and said platforms are interconnected for movement across the bale and wherein said platforms are interconnected for trading positions.

18. A bale processor for reducing bale size of a forage bale comprising:

a main frame;

a bale chamber having end walls and side walls supported by said main frame;

a double sided blade mounted to a knife bar which moves across the bale as said blade slices the bale;

a pair of platforms for securing the bale in said bale chamber, said platforms positioned so that one of said platforms is in a leading position ahead, below and moving with a slicing action of said knife bar while supporting the bale and wherein the other of said platforms is in a trailing position behind, above and moving with said knife bar while supporting a remaining portion of the bale from said double sided blade, wherein said knife bar and said platforms are interconnected for movement across the bale and wherein said platforms are interconnected for trading positions.

19. The bale processor of claim 18, wherein said knife bar and said blade oscillate during slicing of the bale.

20. The bale processor of claim 18, wherein said main frame further includes platform supports to support said platforms during movement of said platforms with said knife bar and wherein said platforms further include wheels and said platform supports further include rails to guide said wheels during movement of said platforms with said knife bar.

* * * * *